United States Patent
Wong et al.

(10) Patent No.: US 9,380,034 B2
(45) Date of Patent: Jun. 28, 2016

(54) SYSTEMS AND METHODS FOR DATA GATHERING WITHOUT INTERNET

(71) Applicants: Sze Yuen Wong, Herndon, VA (US); Amol Kedar, Herndon, VA (US)

(72) Inventors: Sze Yuen Wong, Herndon, VA (US); Amol Kedar, Herndon, VA (US)

( * ) Notice: Subject to any disclaimer, the term of this patent is extended or adjusted under 35 U.S.C. 154(b) by 0 days.

(21) Appl. No.: 14/933,241

(22) Filed: Nov. 5, 2015

(65) Prior Publication Data

US 2016/0087947 A1    Mar. 24, 2016

Related U.S. Application Data

(63) Continuation-in-part of application No. 14/484,359, filed on Sep. 12, 2014, now Pat. No. 9,239,802.

(51) Int. Cl.
| | |
|---|---|
| H04L 29/06 | (2006.01) |
| H04L 9/08 | (2006.01) |
| G06F 12/14 | (2006.01) |
| G06F 21/12 | (2013.01) |
| G06F 21/62 | (2013.01) |

(52) U.S. Cl.
CPC ........ *H04L 63/0428* (2013.01); *G06F 12/1408* (2013.01); *G06F 12/1466* (2013.01); *G06F 21/123* (2013.01); *G06F 21/62* (2013.01); *H04L 9/0869* (2013.01); *H04L 63/061* (2013.01); *G06F 2212/1052* (2013.01); *H04L 2209/24* (2013.01)

(58) Field of Classification Search
None
See application file for complete search history.

(56) References Cited

U.S. PATENT DOCUMENTS

| | | | | |
|---|---|---|---|---|
| 7,143,289 | B2 * | 11/2006 | Denning | G06F 21/10 380/258 |
| 2010/0096452 | A1 * | 4/2010 | Habraken | G06Q 20/327 235/382 |

\* cited by examiner

*Primary Examiner* — Hadi Armouche
*Assistant Examiner* — Andrew Steinle

(57) ABSTRACT

Systems and methods are provided in which external key devices are used for sealing and unsealing data-gathering devices without Internet, wherein the data-gathering devices invalidate the external key devices upon completing data collection in order to seal removable storage. Further, a sealed removable storage is transported to same location of a key server, where the key server uses a multi-factor sealing routine to unlock the sealed removable storage. The routine seals and unseals uses multiple factors including a location of the key server, hardware attributes of the removable storage, hardware attributes of the external key devices, and a private key of the key server. The data-gathering device may be used to support workers collecting data in disconnected parts in the world that are without Internet. The workers may collect data by using mobile devices to transfer data to a shared data-gathering device.

4 Claims, 5 Drawing Sheets

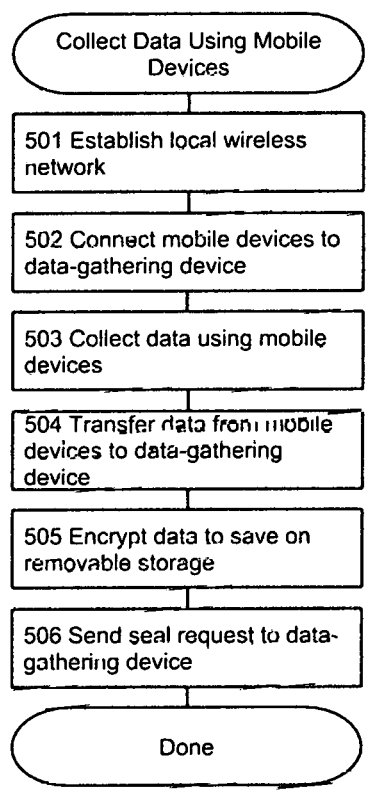
Fig. 5 is a flow diagram of mobile devices transferring data to a shared data-gathering device.

SYSTEMS AND METHODS FOR DATA GATHERING WITHOUT INTERNET

CROSS-REFERENCE TO RELATED APPLICATIONS

The disclosure of U.S. patent application Ser. No. 14/484,359 entitled "SYSTEM AND METHOD FOR PROTECTING A PLUG SERVER USING ENCRYPTION TECHNIQUES WITHOUT INTERNET CONNECTIVITY" to Sze Yuen Wong, filed Sep. 12, 2014 is hereby incorporated by reference.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISK APPENDIX

Not Applicable.

FIELD OF THE INVENTION

The present invention relates to computer-implemented methods and apparatus for survey data collection on a computer device and, more particularly, to a method and system for gathering and sealing of survey data without internet.

BACKGROUND OF THE INVENTION

Presently the plug server is widely used in different parts of the world as a replacement to the heavy computing machines that the cloud computing offers or the highly scalable machines in the data center. This also adds to a lot of onus on protecting the data stored within the plug server.

A previously known application of the plug server is to enable survey data collection in some of the disconnected parts in the world. A team of workers typically shares a plug server, whereas each worker is equipped with a mobile device to collect data by means of a pre-installed mobile application. The plug server establishes a wireless network via an attached WIFI access point, and it is through this wireless network that the workers use the mobile devices to submit collected data to the plug server. The plug server has a pre-installed server application to accept data submitted by the mobile devices, and to save the data to the disk storage of the plug server.

A plug server typically has a processor, expandable memory, and removable disk storage. An eMMC flash disk is a common example of such storage. The data from one plug server can be physically swapped into another and made readable to an end user. When a team of workers carry out a survey in some of the most disconnected parts in the world, it is an important feature to bring additional flash disks for data storage while the team is out in the field, and swap the plug server for replacement flash disks when one disk runs out of space.

The server is typically protected by authentication. Previously known solutions include the use of a username/password login mechanism to secure access to any stored data. Another previously known solution is to use a physical USB device instead of a password for authentication in order to gain access to the server. In such a case, the physical USB device has been pre-registered with the plug server. The plug server can be powered on only in the presence of the registered USB device; otherwise the plug server is disabled by default without the same USB device.

Using of multiple physical flash disks creates a new problem that concerns the security and safety of the collected survey data, which are stored at rest on flash disks when not in use. The physical flash disks are at risks of being misplaced, mishandled, and vulnerable to theft. Previously known solutions attempt to provide protection by means of encrypting the data storage. While this technique protects survey data stored on a physical disk, it does not stop any unauthorized person from gaining access to the survey data if that person obtains the registered USB device, either legally or illegally, or perhaps by accident. This puts the survey data at rest on a disk at risk of being exposed to unauthorized tampering, especially after survey data collection is complete, resulting in a risk of invalidating the whole complete survey program due to questionable integrity of collected data.

Another previously known solution is to use an online-networked key server via the Internet, in an attempt to mitigate the risk associated with using physical USB devices as keys to the plug server. However, the key server in the solution requires the plug server to connect to the key server over the Internet, where the key server is typically hosted at some headquarters or some data centers in the home country. When a team of workers is conducting a survey out in the field of some disconnected foreign countries, Internet access is not readily available. Furthermore, Internet connection among foreign countries typically is subject to firewalls and potential government filtering, resulting in unstable and unreliable Internet connection. An interruption to Internet connection while a survey team is out in the field may potentially result in cancellation of a trip, or worse cancellation of a whole survey program.

Thus, there remains a considerable need for devices and methods that can protect integrity of survey data at rest on a removable storage disk, even in the case of obtaining a registered USB key device by an unauthorized person, from gaining access to the data stored on the removable storage disk.

SUMMARY OF THE INVENTION

Systems and methods are provided in which external key devices are used for sealing and unsealing data-gathering devices without Internet, wherein the data-gathering devices invalidate the external key devices upon completing data collection in order to seal removable storage. Further, a sealed removable storage is transported to same location of a key server, where the key server uses a multi-factor sealing routine to unlock the sealed removable storage. The routine seals and unseals uses multiple factors including a location of the key server, hardware attributes of the removable storage, hardware attributes of the external key devices, and a private key of the key server.

Among the many different possibilities contemplated, the multi-factor sealing routine may use other additional factors to add to the variation of encryption key generation. Some factors contemplated include username and password, security tokens, and digital signatures.

Among possible applications contemplated, one embodiment is for supporting a team of survey workers collecting data in disconnected parts in the world that are without Internet. The workers may collect data by using mobile devices to connect to a shared data-gathering device. The data-gathering device has an attached WIFI access point to establish wireless network for connections of the mobile devices.

BRIEF DESCRIPTION OF THE DRAWINGS

FIG. 5 is a flow diagram of mobile devices transferring data to a shared data-gathering device.

DETAILED DESCRIPTION OF THE INVENTION

Figure 1:
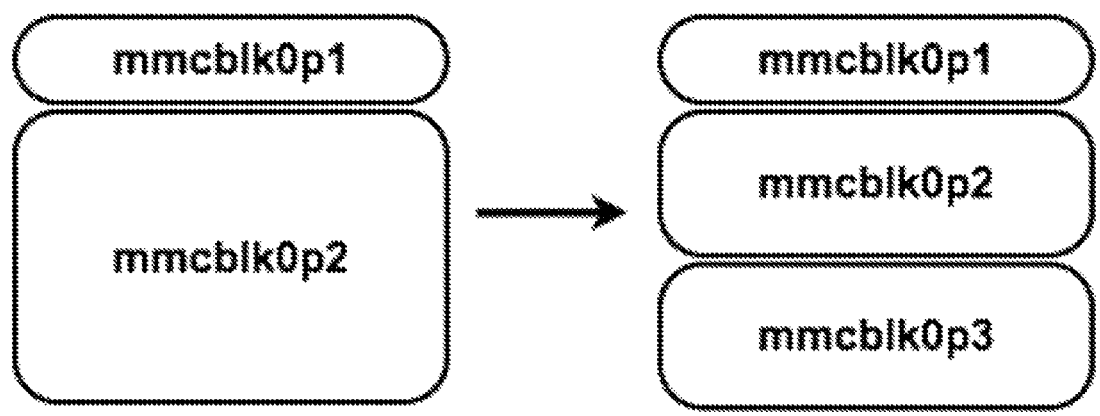
FIG. 1 is a flow diagram of a key server initializing an external key device.

The present invention provides a method and system to secure and protect the data stored on the plug server. A plug server is a computing device designed for general purpose computing needs. A typical architecture is based on processors with expandable memory slots, storage and low power consumption. The plug server provides an alternative to the bulky server in the data center or in the cloud environment due to its low computing/processing needs.

A plug server typically uses an attached WIFI access point to create a wireless network for the connection of mobile devices in close proximity. This enables reading and writing of data via an application installed on the plug server.

The plug server and the attached WIFI access point provide a portable network application that is useful at locations without internet. The low power consumption makes the plug server handy to run even on smaller solar battery packs, making the electricity needs trivial. All these features together make the plug server a preferred computing solution in the 'disconnected' part of the world.

The plug server storage is typically provided as one or more removable data containers. Among the possibilities contemplated, an eMMC flash disk may be such a data container. The data container includes a kernel and root file system.

During our encryption process we will install the decryption key on an externally connected usb key device. If the decryption key is not present during the boot up process, it disables any read and or write I/O operations on the data, and if the key is present during boot up process, it is used to decrypt the data and safely mount it to a usable disk volume.

The original plug storage has 2 partitions, one for the root file system that contains all the applications data files and software needed to run the application and the other for the kernel modules needed to load up the Operating system for the plug server. For our encryption mechanism to work we have added an additional partition to the storage disk. This portion of the disk will be used to store the encrypted data based on the LUKS block level encryption and will need a key file to decrypt the data.

To begin with the encryption process, we first have to connect to the plug using the serial port connector hardware and the FTDI drivers and change the plug internal environment to change the boot sequence of the plug, allowing us to boot the plug from an external usb device. This usb device has 2 partitions as well one for kernel image and the other for root filesystem.

Once the boot sequence is modified, and the plug is starts, we have a clean boot process for the plug into an external device. This lets us now modify the plugs internal data partitions enabling us to start the process to create the third partition. As the plug server completes the startup process, it initially has 2 partitions for e.g. mmcblk0p1 and mmcblk0p2.

We create an additional third partition for e.g. mmcblk0p3, for storing the secure data files. So the mmcblk0p1 partition is formatted using the msdos filesystem which stores the kernel modules on it, while the mmcblk0p2 partition and mmcblk0p3 partition are formatted using the ext4 file system. The root filesystem is stored on mmcblk0p2 partition while mmcblk0p3 partition will be used for storing encrypted application data.

Using ext4 has multiple advantages, it supports a large filesystem, extents are used for storing data which replaces block mapping from previous generations of file system, it has a highly efficient journal checksumming process, and it also gives faster performance.

Based on the research we know that Linux supports two types of encryption mechanisms, file system stacked level and block device level. Choices among encryption techniques can involve tradeoffs between the degree of security and the data processing demands to implement the encryption.

A brief description of the encryption methodologies is cited in U.S. Pat. No. 8,189,769, titled "Systems and methods for encrypting data", in which the author describes optimum method to encrypt contiguous alignment of data blocks. Some examples of file system stacked level encryption are eCryptfs and EncFS, whereas for block device level encryption we have loop-AES, TrueCrypt and LUKS.

We use the Linux Unified Key Setup on disk format (LUKS). It was designed according to TKS1, a template design developed in TKS1 for secure key setup. LUKS closely resembles the structure recommended in the TKS1 paper, but also adds metadata for cipher setup management and LUKS also supports multiple keys/passphrases. It is used to conveniently set up disk encryption based on the dm-crypt kernel module.

The dm-crypt kernel module works at the block device level, enabling users to do transparent encryption of block devices using the kernel crypto API. The module uses the key to encrypt the block device data. DM-Crypt encrypts the so-called backing device (the physical disk) and uses a virtual block device to provide access to the cleartext content below /dev/mapper.

We specify one of the symmetric ciphers, an encryption mode, a key (of any allowed size), an iv generation mode and then the user can create a new block device in /dev. Writes to this device will be encrypted and reads need to be decrypted by passing a key. The filesystem can be mounted on it as usual or it stacks the dm-crypt device with another device like RAID or LVM volume.

Typing up to 32 hex characters from memory may not be easy, but cryptsetup can help. cryptsetup is a tool that generates a cryptographic key from a passphrase, then passes the key to the kernel. Cryptsetup is the utility used very closely with LUKS, for setting up encrypted filesystems using Device Mapper and the dm-crypt target. LUKS defines a header for DM-Crypt partitions. The two important cryptsetup features can be parametrized: key generation and encryption.

The former that will generate a key from the supplied password. This defaults to a hash algorithm, which gives the user the freedom of selecting a password of any length. The hash will compress the information to provide a fixed number of bytes. Two parameters need to be selected for the encryption process: the algorithm and the mode. cryptsetup passes these parameters and the derived key to the kernel, and the DM-Crypt module coordinates the procedure, using the Crypto-API to handle encryption.

Now we configure the LUKS file system partition by initializing the volume and setting initial key and passphrase, Once that is done we create a mapping using the kernel device-mapper, so that the device's decrypted contents could be accessed. There should now be a device node, /dev/mapper/<name>, which represents the decrypted device. This block device can be read from and written to like any other unencrypted block device.

The LUKS stores the encrypted master key in the partition header to support multiple passwords for a single partition. LUKS can store multiple, equivalent copies of the master key and encrypt each one of them with a different string.

Now we need to format the LUKS partition by allocating zeros to the /dev/mapper/<name> encrypted device. This will allocate block data with zeros. This ensures that outside world will see this as random data i.e. it protect against disclosure of data usage patterns.

Since we have to mount this new device to the filesystem we format it with ext4 filesystem and mount it to a local directory on the plug server. This will be the place to store all the files and data that need to be secured. Once the device is mounted we start moving the web server files along with the database and the application data stored in /var/www location into the newly encrypted mount point and create soft links back to the respective locations.

Now that we have encrypted the device and moved the desired files to the mount point, we need a way to decrypt them for making them readable, this will allow our application installed on plug server to function seamlessly with the encrypted partition.

To access the encrypted block device we need to generate a multi bit key using the pseudo-random algorithm and add it to the available key slot on the encrypted device. We have an option to add multiple keys during this key generation process.

These keys have to be transferred onto an external mounted device e.g usb key, which will be connected to the plug during the reboot process. This external device will be used to mount and unmount the encrypted partition on the plug server, therein making it difficult for anyone to get direct access to the data without the key file.

The plug server starts by checking if the encrypting key file is loaded, if its loaded then the plug server proceeds to start the webserver and database server, if the key file is not loaded then the plug server cannot see the desired files to start the webserver and the database server which are need for the application to function and hence it will stop the boot process, making the plug usable.

The keys to the various hardware level attributes of the mounted device are used to match the parent device attribute to that of the child device, which is unique to each external device this almost makes it impossible to replicated the exact key for starting the decryption process for the data at rest at the same time if another cloned copy of the key is used to start the plug server, it won't mount the encrypted disk, thus failing at boot time and making the plug unusable In FIG. 1, a key server initializes an external key device. For each external key device connected to the key server, a multi-factor sealing routine obtains hardware attributes of the external key device, and uses the hardware attributes with a composite key to obtain an external key for decryption of the removable storage. Further, The external key is added to the external key device.

Figure 2:
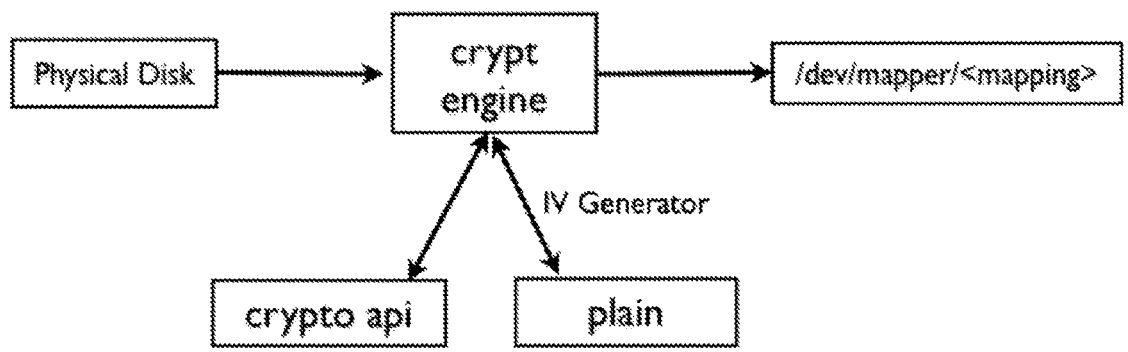
FIG. 2 is a flow diagram of a key server initializing a removable storage.

In FIG. 2, a multi-factor sealing routine uses hardware attributes of the removable storage, a location of the key server, and a private key of the key server to obtain the composite key. Further, the composite key is provided to the removable storage for data encryption. Even further, the location, the hardware attributes of the external key devices, the hardware attributes of the removable storage, and the composite key are discarded from the key server for security purposes.

Figure 3:
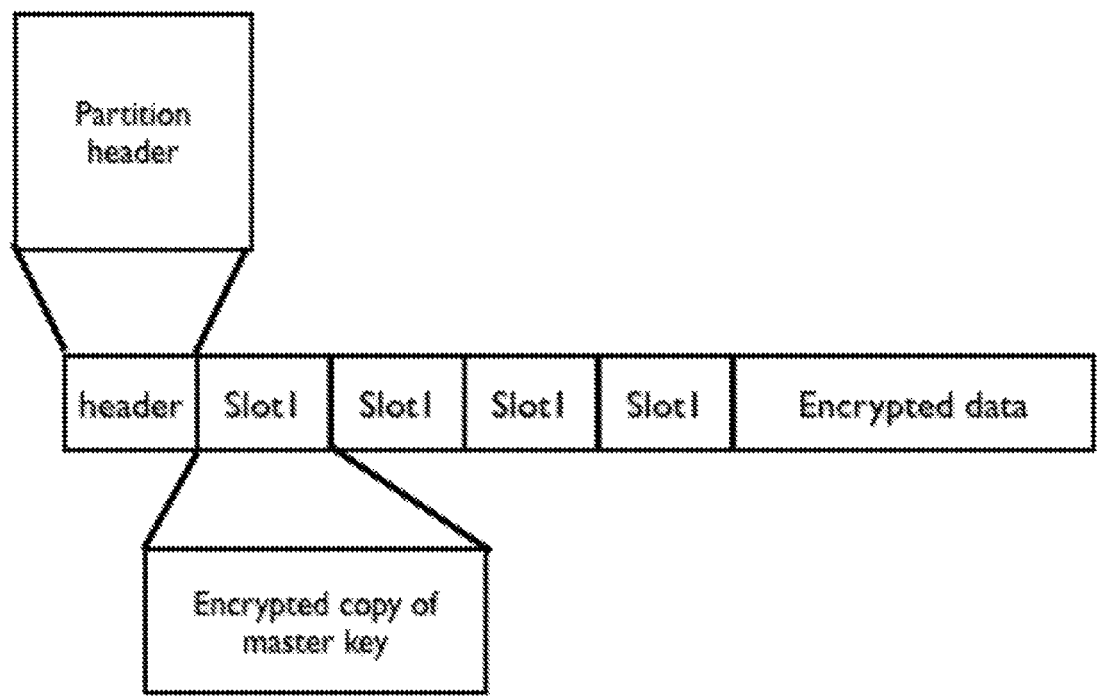
FIG. 3 is a flow diagram of unlocking a sealed removable storage by using a key server.

In FIG. 3, a key server unlocks a sealed removable storage. The key server uses a multi-factor sealing routine to reconstruct a composite key by using a location of the key server, hardware attributes of the sealed removable disk, and a private key of the key server. Further, the composite key is used to decrypt the sealed removable disk for data retrieval.

Figure 4:
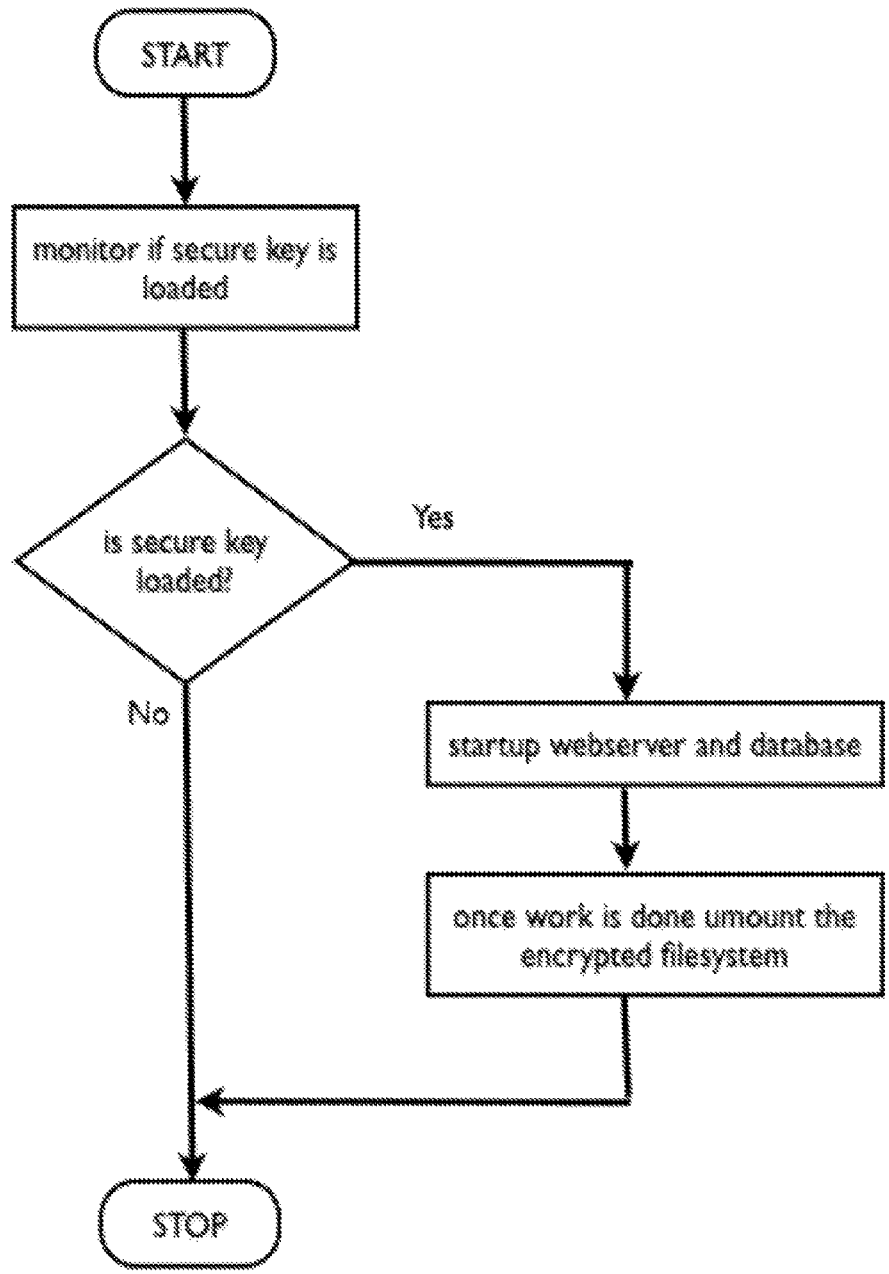
FIG. 4 is a flow diagram of securely sealing a removable storage upon completing data collection by invalidating external key devices.

In FIG. 4, a data-gathering device securely seals a removable storage by invalidating external key devices. Upon completing data collection, the data-gathering device overwrites hardware attributes of all external key devices from the removable storage. Further, the data-gathering device overwrites external keys on all external key devices.

In FIG. 5, a team of workers uses a shared data-gathering device for collecting survey data. Workers use mobile devices to collect data. The mobile devices connect to the data-gathering device wirelessly for data transfer, where the data-gathering device encrypts the data to save in a connected removable storage. Further, the workers repeat the data transfer until completion of the survey, and send a seal request to the data-gathering device.

Data gathered are to be extracted at a secret geographic location unknown to the mobile devices. The location, represented as a 112 bits pseudorandom number, is provided as a first input to a key generation routine. Hardware attribute of a mobile device is provided as a second input to the key generation routine. The routine, taking the first and the second input, generates a pair of survey key and extraction key, where the survey is used for encrypting data, and the extraction key is used for decrypting the data. A mobile device will have access to only the survey key but not the extraction key and also not the secret location, thereby safeguarding integrity of data gathered in a survey out in the field until the mobile device is physically transported to relocated to the secret location. The mobile device is connected to a key server at the secret location, which generates the extraction key accordingly for the decryption of the survey data.

In one preferred embodiment, SHA-1 or compatible cryptographic hash algorithm is used to further secure the secret location input by applying a key server password. Subsequently, the secret location input is digitally signed using a private key of the key server via a DSA or compatible digital signature algorithm. For security purposes, the private key is password protected of at least 112 bits of security strength. In some embodiments, a symmetric algorithm including AES-256 in CBC mode is used for encrypting survey data, and the hardware attribute is provided as the IV required for the symmetric algorithm. Furthermore, the same secret location protected by the key server password is also used with the SHA-1 or compatible hash algorithm for the generation of the extraction key, and the same AES-256 in CBC mode symmetric algorithm is also used for the decryption of the survey data, where the hardware attribute is provided as the required IV.

The invention claimed is:

1. A mobile data protection method for extracting data at a designated location, wherein the location is a pseudorandom secret that is not stored in mobile devices containing the data, the pseudorandom secret has at least 112 bits of security, and the data cannot be extracted at other locations, the method comprising:

generating an encryption key by using a routine, wherein the routine takes a geographic location and a hardware attribute as input parameters; further, providing the same input parameters to the routine always generates the same encryption key;

generating a survey key by providing a geographic location and a hardware attribute to a key server, wherein the hardware attribute uniquely identifies a mobile device;

deleting the geographic location from the mobile device to prevent obtaining the geographic location by obtaining access to the mobile device;

connecting the mobile device to the key server, wherein the key server transfers the survey key to the mobile device;

deleting the survey key from the key server to prevent obtaining the survey key by obtaining access to the key server;

encrypting data on the mobile device by using a survey key, wherein the encrypting comprises:
   i. generating a first key by using the geographic location input together with a first key server password as inputs to a cryptographic hash algorithm including SHA-1;
   ii. providing a second key server password to obtain a key server private key of at least 112 bits of security;
   iii. obtaining a survey key by using the private key to digitally sign the first key, wherein the digital signing uses a digital signature algorithm including DSA;
   iv. encrypting data to obtain a cipher by using a symmetric algorithm including AES-256 in CBC mode, wherein the hardware attribute is used as an IV together with the first key for the encryption;

deleting the survey key from the mobile device at the end of the data collection;

relocating the key server to an extraction point to obtain a real-time reading of geographic location of the extraction point;

relocating the mobile device to the extraction point to provide the hardware attribute to the key server, wherein the key server provides the real-time reading and the hardware attribute to the routine to generate an extraction key; and decrypting data on the mobile device by using an extraction key, wherein the decrypting comprises:
   i. generating the extraction key by using the geographic location input together with the first key server password as inputs to a cryptographic hash algorithm including SHA-1; and
   ii. decrypting the cipher by using a symmetric algorithm including AES-256 in CBC mode, wherein the hardware attribute is used as an IV together with the extraction key for the decryption.

2. A method as in claim 1, wherein the hardware attribute of the mobile device is digitally signed by using the private key of the key server.

3. A method as in claim 1, wherein a portable extraction device is used for the generation of the extraction key; further, the portable extraction device is transported to the extraction point to connect with the mobile device, wherein the extraction key is used to decrypt the data collected on the mobile device.

4. A method as in claim 3, wherein the mobile device is located remotely away from the extraction point, and a pair of portable extraction devices are used for remotely extracting data from the mobile device, the method further comprises:

transporting a first extraction device to the extraction point;

transporting a second extraction device to connect to the mobile device at a same location of the mobile device;

connecting the first extraction device and the second extraction device via a network connection;

transmitting a real-time reading of geographic location of the first extraction device to the second extraction device, wherein the second extraction device generates an extraction key based on the location and a hardware attribute of the mobile device; further, the second extraction device uses the extraction key to decrypt the data collection from the mobile device; and transferring the decrypted data collection from the second extraction device to the first extraction device.

* * * * *